S. A. BENNER.
CAR PART.
APPLICATION FILED DEC. 8, 1913.

1,265,990.

Patented May 14, 1918.
2 SHEETS—SHEET 1.

WITNESSES.
J. R. Keller
John F. Will

INVENTOR
Samuel A. Benner
By Kay Totem & Powell
attys

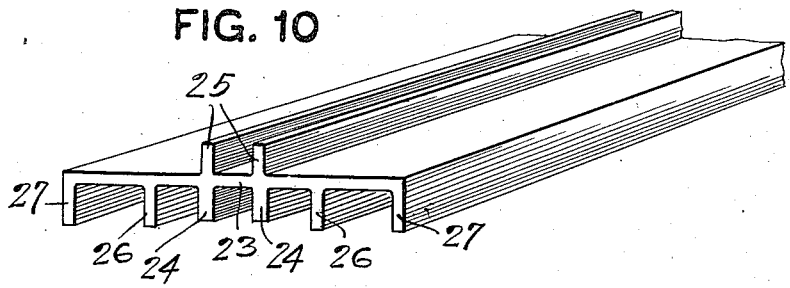
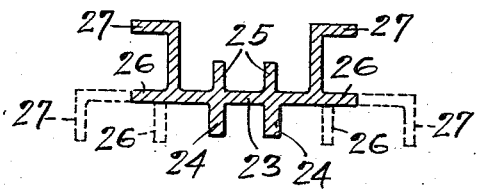
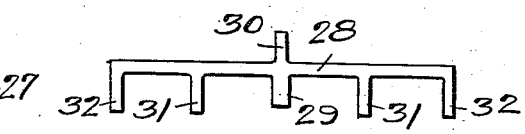
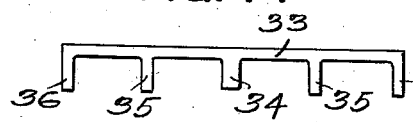
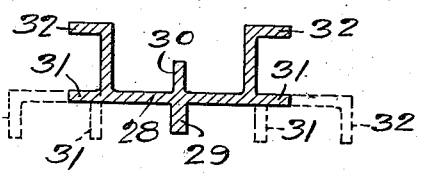
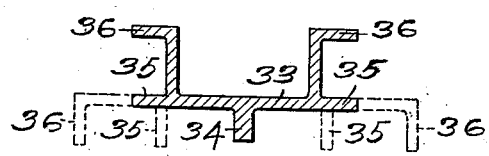
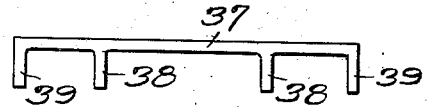
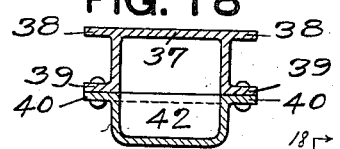
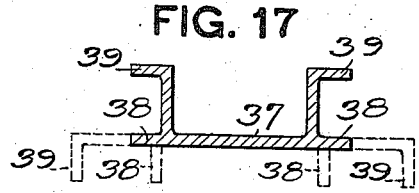
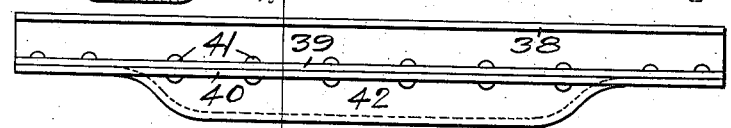

UNITED STATES PATENT OFFICE.

SAMUEL A. BENNER, OF PITTSBURGH, PENNSYLVANIA.

CAR PART.

1,265,990.   Specification of Letters Patent.   Patented May 14, 1918.

Application filed December 8, 1913. Serial No. 805,421.

*To all whom it may concern:*

Be it known that I, SAMUEL A. BENNER, a citizen of the United States, and resident of Pittsburgh, in the county of Allegheny and State of Pennsylvania, have invented a new and useful Improvement in Car Parts; and I do hereby declare the following to be a full, clear, and exact description thereof.

My invention relates to car parts and is particularly concerned with the production of peculiar forms of rolled sections, adapted for use as truck bolsters, truck side frame, car sills and the like.

The object of the invention is the provision of a section of this character which may be economically manufactured and will be unusually strong in proportion to its weight and the amount of material.

In the accompanying drawings the several views illustrate the preferred forms of the rolled section from which the various car parts may be manufactured, and also indicate the manner in which said section may be brought to proper form.

Figure 6:
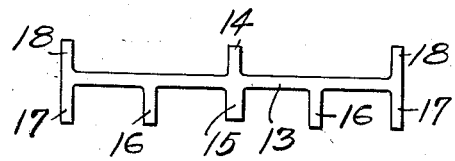
Figure 7:
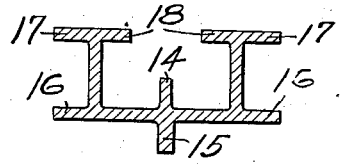
Figure 8:
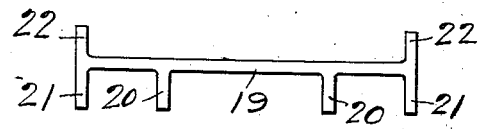
Figure 9:
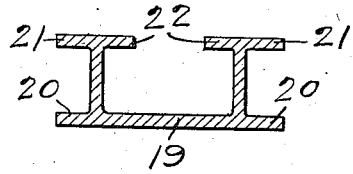

Figs. 6 and 8 are end views of further modified forms of rolled sections and Figs. 7 and 9 illustrate the sections of Figs. 6 and 8 respectively, shaped to proper form.

Fig. 10 is a perspective view of another modified form of section; Fig. 11 illustrates the manner of shaping the section shown in Fig. 10 to proper form.

Figs. 12, 14 and 16 are end views respectively, of further modifications of the sections; Fig. 13 illustrates the manner of shaping the section of Fig. 12 to proper form; Fig. 15 illustrates the manner of shaping the section of Fig. 14; and Fig. 17 the manner of shaping the section in Fig. 16, and Fig. 18 illustrates the manner of use of the section Fig. 17. Fig. 19 is an elevation of the parts shown in Fig. 18.

Figure 1:
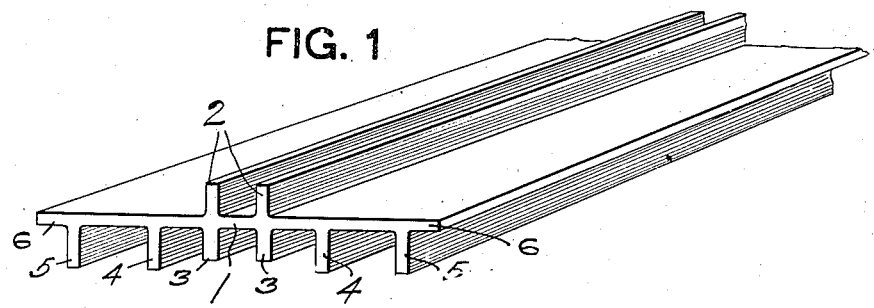
Figure 1 is a perspective view of a section particularly adapted for the manufacture of car bolsters.
Figure 2:
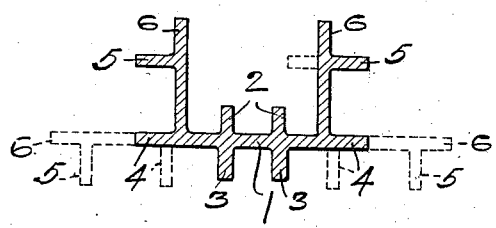
Figs. 2 and 3 illustrate the steps in the shaping of the section shown in Fig. 1 to the proper form.
Figure 3:
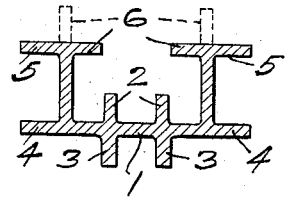

Referring to Figs. 1, 2 and 3, the section here illustrated comprises a base web 1, extending completely across the section, and having a pair of flanges 2 formed on one side thereof and corresponding flanges 3 on the opposite side directly opposite the flanges 2. On the same side of the web of the flanges 3 are flanges 4—4 and 5—5. The base web 1 extends beyond the outer flanges 5—5 forming lateral extensions 6—6 in the completed sections. This section may be readily rolled in the manner well known to those skilled in the art of metal rolling.

In Fig. 2 is illustrated the first step in the shaping of the section to car bolster form. By suitably arranged rolls the web 1, together with the flanges 4 and 5, are bent or pressed upwardly along the inner lines of junction of the flanges 4 with the web. Thus the flanges 4 and 5 become lateral extensions of the web 1 and the portions of the web 1 between the flanges 4 and 5 become the side walls of the main channel member of the bolster in this case. At the completion of this step in the shaping operation, the lateral extensions 6 of the main web remain in line with the side walls of the channel. In Fig. 3 these web extensions 6 are shown as bent laterally, thus forming with the flanges 5 and the flanges 4 and adjacent portions of the main web, I beams which extend longitudinally along each side of the completed structure. It will be seen, therefore, that by so shaping the section shown in Fig. 1, a box-like truss member or bolster may be produced with the greatest economy in manufacture, and at the same time with extreme lightness in proportion to its strength. The flanges 3—3 form strengthening members for the base web of the truss member or bolster and may be sheared off at their ends to the fish belly shape illustrated in Fig. 2 of the drawings, of my co-pending application, Serial No. 800,879, filed November 13, 1913.

Figure 4:
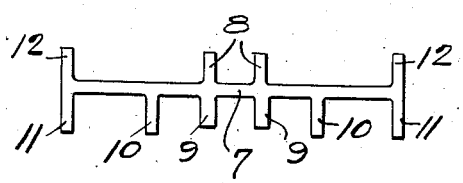
Fig. 4 is an end view of a modified form of a rolled section, and Fig. 5 indicates the manner of shaping this section to the proper form.
Figure 5:
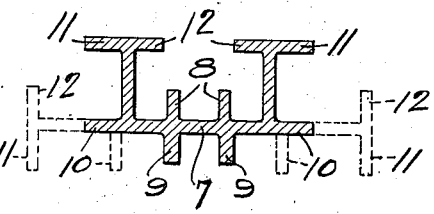

In Figs. 4 and 5 is illustrated a modified form of section for producing a truss member or bolster illustrated in Fig. 3. In this case the section comprises a web 7, upper strengthening flanges 8—8, lower strengthening flanges 9—9, flanges 10, 10, flanges 11, 11 and flanges 12, 12. In this case the main web is bent or pressed upwardly along the line of junction of the flanges 10, 10 with the main web, whereby I-beams comprising the flanges 10, 10 which have now become lateral extensions of the main web, flanges 11, 11 and flanges 12, 12, are immediately formed without the necessity of subsequently bending down the parts 12, 12 corresponding to the parts 6, 6 in Fig. 3, as before described. The strengthening flanges 9, 9 may here also be sheared to produce the fish-belly structure heretofore described.

In Figs. 6 and 7 is illustrated an end view of a section and a transverse sectional view of a truss member or car part formed from said section. In this case the section comprises the main web 13, the upward strengthening flange 14, the downward strengthening flange 15, the flanges 16, 16 flanges 17, 17 and flanges 18, 18. This section is also shaped or pressed up into the form illustrated in Fig. 7 as heretofore described.

A modified form of section illustrated in Fig. 8 comprises the main web 19, flanges 20, 20, flanges 21, 21 and flanges 22, 22.

Fig. 9 illustrates the section shown in Fig. 8 shaped or pressed up to the form of a car part, the portion of the main web between the flanges 20, 20 and flanges 20 themselves becoming the base web of the car part, and this base web, together with the portions thereof bent upwardly, and the flanges 21 and 22, become the I-beams extending longitudinally along each side of the completed structure.

In Fig. 10 the modified form of section comprises the main flanges 23, strengthening flanges 24, 24, strengthening flanges 25, 25, flanges 26, 26 and flanges 27, 27. This section is bent or pressed upwardly in a manner similar to that described for the various sections whereby the main web 23 and the flanges 27 form the base web of the structure and the bent up portions of the main web together with the flanges 27, form with the base web, channel members, instead of I-beams extending on each side of the completed structure as indicated in Fig. 11.

The modified section Fig. 12 comprises the main web 28, a central strengthening flange 29, upper strengthening flange 30, flanges 31, 31 and flanges 32, 32.

In Fig. 13 this section is shown as bent to structural form in the manner heretofore described, whereby the portion of the main web 28 between the flanges 31, 31, together with said flanges 31, 31, become the base web of the structure, the portions of the main web together with the flanges 32, 32 forming with the flanges 31, 31, channel members extending along each side of the completed structure.

The section shown in Fig. 14 consists of the main web 33, central strengthening flanges 34, 34, flanges 35, 35, and flanges 36, 36. This section is shown as bent to structural form in Fig. 15 as heretofore shown.

In Fig. 16 the section comprises the main web 37, flanges 38, 38 and flanges 39, 39. This section is shown bent to structural form in Fig. 17.

The sections illustrated in Figs. 1 to 7 and Figs. 10 to 15 are particularly, though not exclusively, adapted for use in car bolsters, although it is obvious that they may be also used in many instances as car sills, or any other relation where truss members are desirable.

The sections illustrated in Figs. 8 and 9, 16 and 17, are particularly, though not exclusively, adapted for use as side frames or as car sills. The section in Figs. 16 and 17, however, may also be advantageously employed in car bolsters as illustrated in Figs. 18 and 19. In said figures, the section is shown in reversed position or up-side-down, in which the main web 37 becomes the upper web of the car bolster and the lateral channel members become the main truss members and moreover, the flanges 39, 39 afford convenient means for securing a fish-belly strengthening member to the main bolster section. This fish-belly member may be formed by pressing it or shaping a flat plate of rolled steel, thus providing the same with lateral flanges 40, adapted to be riveted to the lateral flanges 39, as at 41. The central portion of this plate is pressed or shaped to form the fish-belly structure 42 for the purpose of imparting the greatest possible strength longitudinally of the bolster. It will be noted also that strengthening flanges 38, 39 and 40 form a peculiarly strong construction to resist lateral twisting strains on the bolster.

It will be noted that in all the forms of the invention described, the structures consist essentially and in the first instance, of a simple rolled section of steel of a form which may be readily and easily rolled in a manner well known to those skilled in this art.

The shaping of the section consists of mere pressing or bending operations, which bring the rolled shape into proper structural form. In each instance it will also be noted that the truss member or structure so produced, includes in all cases channel members extending longitudinally along each side of the structure thus affording great strength for the resisting laterally of twisting strains.

In the form shown in Figs. 1 to 9 inclusive, these channel members may be developed into I-beam structures without, however, destroying the basis channel formed thereof. In all instances, moreover, it will be noted that the completed structure is more or less of box-like form, thus affording the greatest strength for resisting not only compression, but also lateral and twisting strains. The simplicity of the completed form of bolster pressed from these sections, is illustrated in my co-pending application above referred to.

While I have herein described the preferred embodiment of the invention, it is to be understood that the same may be altered in details and arrangements of parts within the scope of the appended claims.

What I claim is:

1. A blank for a car part consisting of a rolled section comprising a web having a plurality of flanges projecting from one face thereof, said blank being rolled, pressed or bent longitudinally to cause said flanges to form laterally opening channel members extending along each side of the finished structure.

2. A blank for a car consisting of a rolled section comprising a web having a plurality of flanges projecting from one face thereof, said blank being rolled, pressed or bent longitudinally to cause said flanges to form laterally opening channel members extending along each side of the finished structure, said web having one or more strengthening flanges extending longitudinally thereof intermediate its side edges.

3. A blank for a car part consisting of a rolled section comprising a web having a plurality of flanges projecting from one face thereof, said blank being rolled, pressed or bent longitudinally to cause said flanges to form laterally opening channel members extending along each side of the finished structure, said blank having one or more strengthening flanges extending from opposite faces thereof forming truss members in the completed structure.

4. A blank for a car part consisting of a rolled section comprising a web having a plurality of flanges projecting from one face thereof, said web being so rolled, pressed or bent longitudinally that the opposite sides of said web and certain of said flanges form I-beams extending longitudinally along each side of the completed structure.

5. A blank for a car part consisting of a rolled section comprising a web having a plurality of flanges projecting from opposite sides thereof, the side portions of said web and certain of said flanges being rolled, pressed or bent longitudinally of the blank to form I-beams extending longitudinally at each side of the finished structure.

6. A blank for a car part consisting of a rolled section having flanges extending longitudinally adjacent each side edge thereof, and flanges extending longitudinally intermediate said first named flanges, said blank being so rolled, pressed or bent that said intermediate flanges form lateral extensions of the web, and said bent up portions of the web and said edge flanges form with said extensions channel shaped members extending longitudinally at each side of the finished structure.

7. A blank for a car part consisting of a rolled section having flanges extending longitudinally adjacent each side edge thereof, and flanges extending longitudinally intermediate said first named flanges, said blank being so rolled, pressed or bent that said intermediate flanges form lateral extensions of the web and said bent up portions of the web and said edge flanges form with said extensions I-beams extending longitudinally at each side of the finished structure.

8. A car part consisting of a rolled section comprising a web having flanges at its lateral edges extending from each face thereof, flanges extending longitudinally intermediate of said flanges, said blank being so rolled, pressed or bent that said intermediate flanges form lateral extensions of the web and said bent up portions of the web together with the edge portions form I-beams extending longitudinally at each side of the finished structure.

9. A car part having a rolled section comprising a web having laterally opening channel members extending along each side thereof and a section having a portion of its area pressed or stamped to fish-belly shape and having longitudinal flanges at each side thereof secured to the longitudinal outer flanges of the channel members of said first section.

In testimony whereof, I the said SAMUEL A. BENNER have hereunto set my hand.

SAMUEL A. BENNER.

Witnesses:
ALVAR C. PURDY,
ROBT. D. TOTTEN.